Sept. 19, 1933.  F. C. OVERBURY  1,927,444
MOTOR VEHICLE SAFETY SYSTEM
Filed Jan. 27, 1932
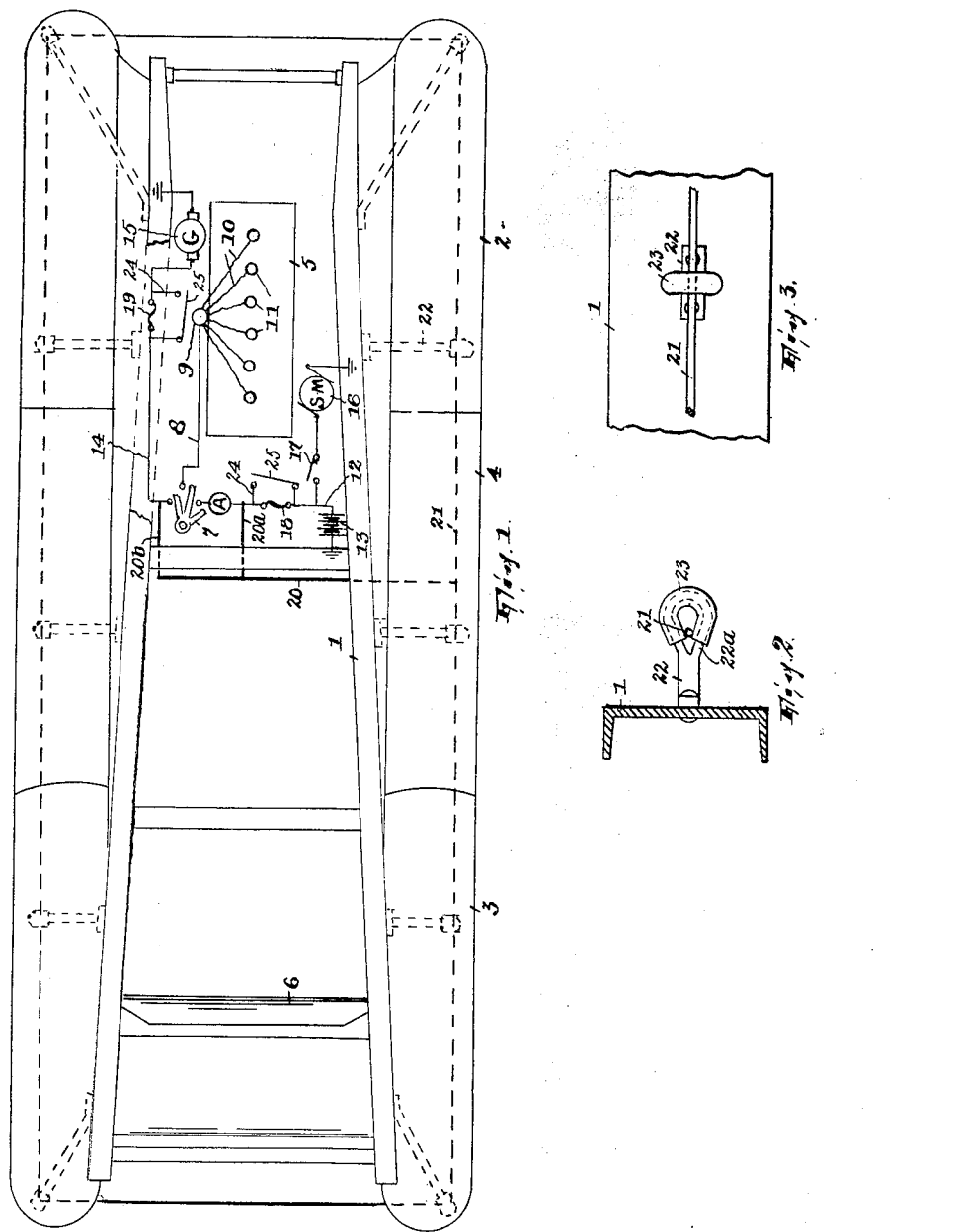
INVENTOR,
Frederick C. Overbury,
BY
John Steward,
ATTORNEY.

Patented Sept. 19, 1933

1,927,444

UNITED STATES PATENT OFFICE 1,927,444

MOTOR VEHICLE SAFETY SYSTEM

Frederick C. Overbury, Hillsdale, N. J.

Application January 27, 1932. Serial No. 589,208

5 Claims. (Cl. 180—83)

This invention relates to automotive vehicles, such as automobiles, aeroplanes, and the like, and especially those of the class carrying gasoline or other explosive substance and having electrical equipment for igniting said substance when used as the fuel for driving the vehicle, for illumination, etc., and its underlying object is to prevent a conflagration due to ignition by the electrical system in the event of a collision and the possible destruction of the vehicle, not to mention death or serious injury to the occupants. More specifically, the object is to provide for breaking and thereby paralyzing the said system in the event of a collision so that sparking or other ignition from said system, whether vagrant, as an incident of uncontrolled short-circuiting of the system by the collision, or normal, as an incident of the motor continuing to function after the collision, shall at once be further impossible. And here I indicate the fundamental novelty of my invention as distinguished from the prior art as I know it.

According to my invention, given the electrical circuit system of the vehicle including a source of current, I place in said system an electrically energizable disrupter therefor and provide the vehicle with means arranged to be disturbed in collision of the vehicle with some other object and thereupon adapted to energize the disrupter. In the simplest form the disrupter is a fuse and said means is a normally open short-circuit means extending around the energy source and fuse and having a circuit-closer arranged to be closed by the object with which the vehicle collides.

It is known to short-circuit an electrical system in this art—for instance, Dalton Patent No. 1,437,466,—but there the system upon short-circuiting still remains a complete circuit and hence a menace in view of possible vagrant sparking, as if some part thereof obtains a sparking or arc-forming contact with another part of the vehicle. It is known also to break or paralyze an electrical system in this art—for instance, Kilgour Patent No. 1,740,896,—but there the circuit breaking element is not electrically affected to paralyze the system but depends for its functioning to that end on its being shifted out of normal position as an incident of its inertia when the collision occurs, so that if the vehicle and hence said medium upon the collision ultimately retain their normal or nearly normal positions the system will remain only momentarily disestablished and as soon as re-established will again be a menace.

When the electrical system of the vehicle is concerned in its propulsion it is usual to provide a generator as well as a storage battery as a source of energy; my invention contemplates further paralyzing the system with respect to the generator as well as the battery when a collision occurs, thus to eliminate the menace from either of such sources.

The accompanying drawing presents in

Fig. 1 a diagrammatic plan of my invention applied to an automobile;

Fig. 2 a side elevation of a detail involving the circuit closer of the mentioned short-circuiting means; and Fig. 3 a view of said detail as seen from the right in Fig. 2, a part of the frame of the vehicle appearing in section.

At 1 is shown the frame of the vehicle, which at each side may carry the fenders 2—3 and running board 4.

At 5 is an internal-combustion motor to be driven by gasoline or other explosive fuel carried in the tank 6 and supplied to the cylinders of the motor in the usual way.

Ignition of the explosive charges by sparking in the motor cylinders being assumed to be the service performed by the electrical system in the present example, (though electrical ignition of any kind or for any purpose is of course within the invention) I have schematically shown said system so functioning. Following the usual practice in the case of automobiles there are shown for supplying the current for sparking not only a storage battery but a motor-driven generator, the latter functioning above a certain speed of the motor for the sparking and also for charging the battery. The usual ignition switch is shown at 7 and when shifted is adapted to contact with the adjoining terminal of a conductor 8 which contains the usual distributor 9, which in turn has the usual leads 10 to the spark-plugs 11 of the motor, each of course grounded on the motor block as usual, to wit, on fixed (metal) structure comprising the frame 1 and said block. At 12 is a branch conductor grounded on the fixed structure, containing the said battery, 13, and the usual ammeter A, and terminating in proximity to the switch for contact thereby. At 14 is another branch conductor grounded on said fixed structure and containing the generator 15 and also terminating in proximity to the switch for contact thereby. The thus binary character of the electrical system is of course immaterial; in other words, what is material in the example is that there is an electrical system which includes a source of current, a device or devices, as 11, to function electrically on passage of a current and circuit-forming means which, according as it is the battery or the generator which at any time is functioning, includes on the one hand 8—12 and the fixed structure and on the other includes 8—14 and said structure, assuming of course in each case that the switch is shifted to connect the terminals of 8, 12 and 14. (There will of course be as usual an induction coil for producing the necessary intensity of the current for sparking, but this is immaterial to the present invention and so is not shown.) At 16 is the starting motor which is put in circuit with the battery when a switch 17 is closed, being here immaterial.

The disrupter hereinbefore mentioned is here a fuse. In the present example one such fuse 18 is placed in the branch-conductor 12 and another, 19, in the branch conductor 14, in each case preferably close to the corresponding source of energy 13 or 15. The short-circuiting means includes a conductor 20 having branches 20a and 20b which respectively connect with the branch conductors 12 and 14 between the source of energy in each case and the switch 7, said conductor 20 having a circuit closer 21 which, as will appear, may contact with the fixed structure but is normally out of contact therewith. When such contact and consequent short-circuiting occur the fuse (here both fuses) blow out, thus paralyzing the electrical system so that it is no longer a menace in respect to its normal functioning (here sparking) nor in respect to vagrant sparking or arcing due to possible contact or contiguity of some portion thereof with the fixed structure.

The particular form or placement of the circuit closer 21 is not a material matter, though I prefer to form it so as to encircle or substantially encircle the vehicle as shown in Fig. 1. It may be a strong metal endless wire which extends around the vehicle, under the fenders and running board, and it may be supported in normally "open" position as follows: The fixed structure may include outwardly projecting metal arms 22 each having what is essentially a fork 22a receiving the wire in its V-shaped crotch, such fork being here developed as a loop which is enveloped by an insulating and yielding, as rubber, tube 23, the ends of which by actually or approximately meeting normally hold the wire out of contact with the arm, though adapted to yield to permit such contact on sufficient pressure being exerted inward on the wire, as in a collision. If the circuit closer encircles the vehicle and is a flexible element, as said wire, an impact in collision occurring at any point around the vehicle will bend in said element and close the circuit.

In order that, in case the vehicle is not so crippled that it cannot proceed under its own power, the electrical system may after it is paralyzed in collision be restored to operative condition the fuse or fuses which have been blown out may be replaced or a shunt 24 around the fuse or each fuse may be closed by a switch 25, in case a fresh fuse is not available or the vehicle is so damaged that the disabled fuse is not accessible.

As for my circuit-closer 21: So far as I am aware, given a vehicle having an open electric circuit formed in part by the fixed structure of the vehicle and having a terminal (as 22) forming a projecting portion of the fixed structure, and given a circuit-closer (as 21) to contact with said terminal to close the circuit, it is new to employ yielding insulation (as 23) to normally hold the circuit-closer out of closing position but yieldable thereto when the circuit-closer is impelled. (In any kindred prior art construction the means for normally holding an inwardly impellable circuit-closer out of closing position was merely a yielding spacing means, not insulative.)

Given also a vehicle having an open electric circuit formed in part by the fixed structure of the vehicle and having portions (22) of the latter spaced from each other around the vehicle each forming a terminal at one side of the opening in the circuit, it is new to provide a flexible circuit closer for the opening carried by and extending around the vehicle in position to be flexed into contact with one or the other of said portions.

Having thus fully described my invention what I claim is:

1. A vehicle having an electrical circuit system including a source of current and a fuse, and a normally open short-circuit means for said system extending around said source and fuse and having a circuit-closer arranged to be closed by an object with which the vehicle collides.

2. A vehicle having an electrical system including a conductor and a pair of branch-conductors and a battery and a fuse in one and a generator and a fuse in the other branch-conductor, a circuit-closer to connect the branch-conductors simultaneously with the conductor to complete a branched circuit, and a normally open short-circuit means for said system having branches connected respectively with the branch-conductors, one between said circuit-closer on the one hand and the battery and fuse on the other and the other between said circuit-closer on the one hand and the generator and fuse on the other, said means having a circuit-closer arranged to be closed by an object with which the vehicle collides.

3. A vehicle having an electric circuit-system including a source of current, means on the vehicle, arranged to be disturbed on collision of the vehicle with some other object, for increasing the strength of the current in a part of the circuit-system, and a circuit-disrupter for said part adapted to be energized to disrupt said system on such increase in strength of the current.

4. A vehicle having an electric circuit-system including a source of current, means on the vehicle, arranged to be disturbed on collision of the vehicle with some other object, for short-circuiting, and thereby increasing the strength of the current in a part of said circuit-system, and a circuit-disrupter for said part adapted to be energized to disrupt said system on such increase in strength of the current.

5. A vehicle having an electrical circuit system including a source of current and electric ignition means energized by said source and also a fuse between said source and means, and means, connected to said system between said fuse and ignition means and including a circuit closer arranged to be closed on collision of the vehicle with some other object, for short-circuiting said system.

FREDERICK C. OVERBURY.